United States Patent [19]
Gold

[11] Patent Number: 6,036,263
[45] Date of Patent: Mar. 14, 2000

[54] INFANT REST

[75] Inventor: Katherine Gold, Denver, Colo.

[73] Assignee: Gold Bug, Inc., Denver, Colo.

[21] Appl. No.: 09/152,149

[22] Filed: Sep. 11, 1998

[51] Int. Cl.[7] .................................................. A47C 31/00
[52] U.S. Cl. ......................... 297/219.12; 5/655; 297/397
[58] Field of Search .............. 297/219.12, 397, 297/250.1; 5/655, 922, 633

[56] References Cited

U.S. PATENT DOCUMENTS

| | | | |
|---|---|---|---|
| 3,995,335 | 12/1976 | Neely | 5/327 |
| 4,383,713 | 5/1983 | Roston | 297/219 |
| 4,434,513 | 3/1984 | Welch | 2/410 |
| 4,779,930 | 10/1988 | Rosen | 297/397 X |
| 5,103,514 | 4/1992 | Leach | 5/417 |
| 5,228,745 | 7/1993 | Hazel | 297/219.12 X |
| 5,383,711 | 1/1995 | Houghteling | 297/397 |
| 5,486,037 | 1/1996 | Harper | 297/219.12 X |
| 5,586,351 | 12/1996 | Ive | 5/655 |
| 5,699,569 | 12/1997 | Schwarz-Zohrer | 5/655 |
| 5,735,576 | 4/1998 | Pepys et al. | 297/397 |
| 5,797,155 | 8/1998 | Maier et al. | 297/452.41 X |

*Primary Examiner*—Peter M. Cuomo
*Assistant Examiner*—Stephen Vu
*Attorney, Agent, or Firm*—John E. Reilly

[57] ABSTRACT

An infant rest, particularly for use with infant support devices, such as cribs, bassinets, strollers, infant seats and the like. The infant rest of the present invention provides not only support for the head of the infant from sudden movements and the impact from sudden movements but from the effects of the environment as well. A padded roll is formed by a doubled padded layer which provides protection from sudden movements and the impacts from sudden movement. A zipper or other fastener is disengaged to allow this doubled padded layer to extend upward into a single layer to form a bonnet around the head of the infant. This provides protection from excessive sun, wind, cold or other environmental causes.

17 Claims, 1 Drawing Sheet

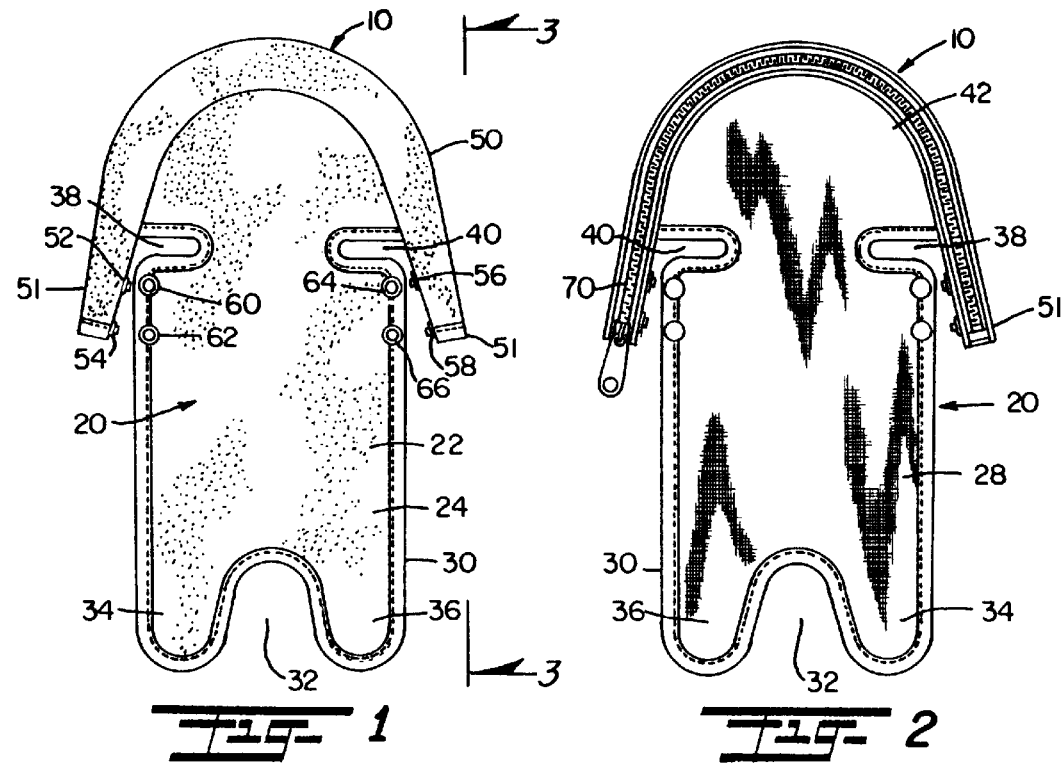
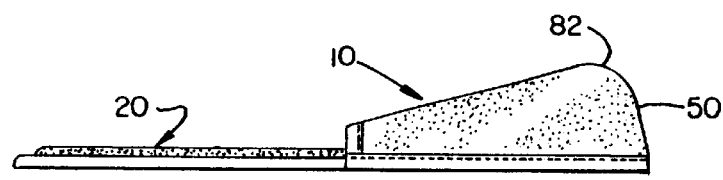
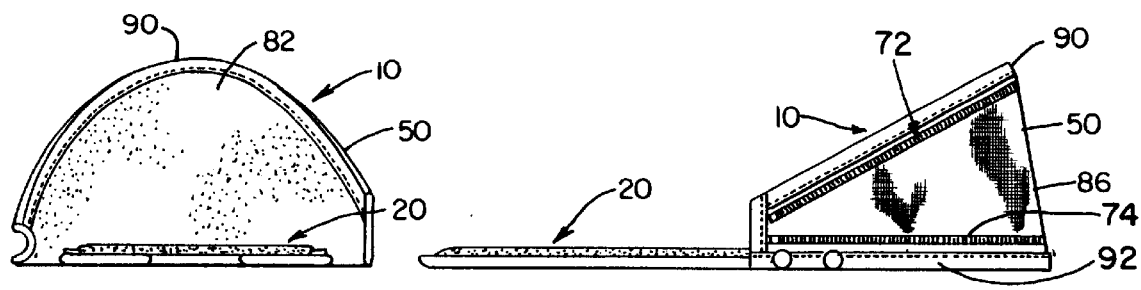
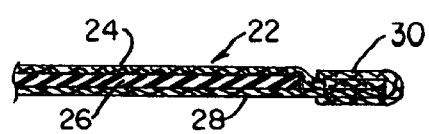
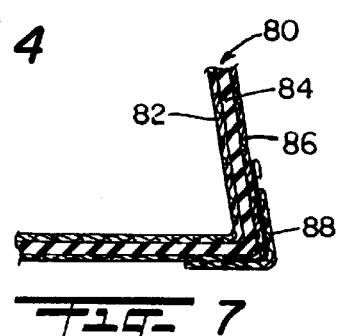

INFANT REST

BACKGROUND AND FIELD OF INVENTION

This invention relates to infant rests; and more particularly relates to a novel and improved environmentally protective rest for infants.

It is well known to provide protective devices for infants, particularly for supporting the head of an infant and/or protecting the head of the infant from the impact of sudden movement of the infant. For instance, U.S. Pat. No. 4,434,513, issued to Welch, discloses a protective device for infants which provides a padded roll which will protect against the effects of a sudden movement in rolling over, moving when lying, or other sudden movements. Another infant head support device is disclosed in U.S. Pat. No. 5,383,711, issued to Houghteling. This infant head support device also supports the lateral sides of the infant's head from sudden movement or impact. Other examples of infant head supports are disclosed in U.S. Pat. No. 5,228,745, issued to Hazel and in U.S. Pat. No. 4,383,713, issued to Roston. These types of devices are solely concerned with providing support for the head of an infant and/or protection from impact arising from sudden movements.

However, there has been little in regard to adding additional protection integrally to such infant head supports. Infants are often susceptible to harm from the environment, such as excessive levels of radiation from the sun, wind, rain, cold and the like. Usually this is addressed by covering the infant with blankets, using umbrellas or by adding more clothing, such as hats or caps. However, the infant is often disturbed in this process. Also, often the infant may be in a situation where the availability of these extraneous items are not readily available.

It is therefore desirable to provide a protective device for an infant which will not only protect the head of the infant from sudden movement or impact but also affords protection from the effects of the environment.

SUMMARY OF THE INVENTION

It is therefore an object of the present invention to provide for a novel and improved protective device for infants. It is particularly an object of the present invention to provide protection to the head of the infant from the elements.

It is another object of the present invention to provide an infant protective device which can be used in a variety of situations, such as on cribs, infant seats, infant carrying devices, strollers, and the like.

In accordance with the present invention, an infant support or rest is formed from soft yet firm padding in a fabric layer. A U-shaped padded roll or padded layer defining a protective member is attached at the upper end of a base support panel. This padded roll or padded layer performs the dual function of protecting the infant from sudden impacts as well as providing protection from the environment. In the first function, the padded roll includes a padded layer of compressible material doubled over or folded in a lowered position. In this lowered or folded position, the padded layer fits near the head of the infant. If the infant is suddenly upset, or turns its head suddenly, the protective member engages the infant's head to absorb the impact from the infant's head.

In the second function, the infant rest further includes a means for releasing the protective member from the folded position, such as a releasable fastener, so that the U-shaped padded layer can be extended upwardly by unfolding the doubled layer into a single upright self-supporting layer to form a protective bonnet around the head of the infant. This protective bonnet has an upper edge sloping down from a or midpoint along with a convex or U-shape configuration which enables the single layer to be self-supporting in the raised position and minimizes the effects of excessive sun, wind, rain, cold and the like on the infant.

The above and other objects of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 1 is a top view of a preferred embodiment of the present invention illustrating An infant rest;

FIG. 2 is a bottom view of the device of the invention of FIG. 1;

FIG. 3 is a side view of the device of the invention of FIG. 1;

FIG. 4 is a side view of the device of the invention of FIG. 1 in the extended position;

FIG. 5 is a front view of the device of the invention of FIG. 1 in the position of FIG. 4;

FIG. 6 is a cutaway view along lines 6—6 of FIG. 1; and

FIG. 7 is a cutaway view along lines 7—7 of FIG. 4.

DETAILED DESCRIPTION OF PREFERRED EMBODIMENT

Referring in more detail to the drawings, as shown in FIGS. 1–7, a preferred embodiment of the present invention is described In this particular preferred embodiment an infant protective device is illustrated. It is to be clearly understood that this preferred embodiment is provided for descriptive purposes only and is not meant to unduly limit the scope of the inventive concept. Other embodiments are included within the inventive concept as set forth in the appended claims.

The infant protective device 10, as shown in FIG. 1, is intended for use on an infant carrier seat, crib, bed, bassinet, high chair, infant seat, stroller or other surface on which an infant may be placed. The infant protective device 10 includes a base panel 20. The base panel 20 is in the form of a fabric layer 22 having an outer surface 24, an inner padded layer 26, and a backing layer 28, as can be seen in FIG. 6. The materials used in forming the layer 22 are similar to the materials described in U.S. Pat. No. 4,434,513, incorporated herein by reference, or other materials chosen to provide a relatively soft but firm surface for supporting an infant lying upon it. The layer 22 includes a rolled seam 30, shown in FIG. 6, to form a soft edge on the protective device 10. The base panel 20 is of a length to provide a support surface for most infants. A lower notch 32 forming the leg portions 34, 36 of base panel 20 is well known and does not form part of the present invention. Likewise, the two upper side notches 38, 40 for use with safety straps to restrain the infant are also well known. Safety straps, from a stroller, infant seat, or the like, are inserted through the notches 38, 40 and pass around the infant for restraint of the infant.

An important feature of this invention is a padded layer or protective member 50 attached to the upper end 42 of base panel 20. The padded layer 50, in the folded position illustrated in FIGS. 1–3, performs the functions of protecting the infant's head in a similar fashion as described in U.S. Pat. No. 4,434,513. The padded layer 50 is preferably of a generally U-shaped or semi-circular configuration having an upper edge 90 and a lower edge 92, and terminating in opposite free ends 51 and is formed of a doubled-over thickness of a layer of flexible padding 80, described in detail below.

Snap connectors 52, 54, 56, 58 are attached near the free ends 51 of the padded layer 50 with their mating connectors 60, 62, 64, 66 attached to opposing portions of the base panel 20. These connectors are fastened to their mating connector to form a secure attachment around the infant's head. Also, any safety straps inserted in the side notches 38, 40 are secured therein. The free ends 51 of the padded layer 50 extend down below the shoulders of an infant supported on the base panel 20 to prevent sudden movements by absorbing the impact of the infant's head.

A particularly inventive feature of the infant protective device 10 of the present invention is the ability to provide additional protection, particularly from the effects of the environment. As shown in FIG. 2, a releasable fastener 70, such as, a zipper extends along substantially the length of the upper edge 90 and the lower edge 92 of the padded layer 50. The releasable fastener 70 includes a first portion 72 and a second portion 74, said first portion 72 extending along the upper edge 90 and said second portion 74 extending along lower edge 92 of the padded layer 50. It is to be clearly understood that other connection devices could be used in lieu of the zipper, such as hook and loop strips (such as "Velcro™"), snap connectors or other connection devices.

As described above, the U-shaped padded roll 50 is formed from a doubled thickness of layered padding 80. This layered padding 80 includes an outer surface layer 82 shown in FIG. 7 formed of a soft absorbent material, a flexible inner padding 84 formed of a compressible, resilient material, shown in FIG. 7, and a thin, protective layer 86. A protective seam 88, shown in FIG. 7, is used to form a soft edge on the protective device 10 as well as provide additional reinforcement. When the zipper 70 is unzipped, the upper edge 90 of the padded layer 50 near the zipper 70 is unfolded upwardly to a substantially upright self-supporting position shown in FIGS. 4 and 5, said padded layer 50 extending to a distance higher than when said padded layer is in said folded position forming said padded roll. The padded layer 50 then forms a protective shell which still maintains the U-shape of the padded roll 50, as shown in FIGS. 4 and 5 with the upper edge 90 extending above the base panel 20. The upper edge 90 of the protective member 50 slopes downwardly from a midpoint to the free ends 51. This shape of the protective member provides reinforcement for the protective member, which in combination with the U-shaped configuration assist in maintaining the protective member in a self-supporting position. The engagement of the snap connectors 52–66 also assist in maintaining not only the rigidity of the protective member but the base panel 20 as well. The padded layer 50 is thus converted from a padded protective roll to a bonnet or generally convex shell for shading and partially covering the infant's head from the environment.

When the environmental protection is no longer needed, the upper edge 90 of the padded layer 50 is pulled downward to double the layered padding 80. The zipper 70 is engaged and zipped together to reform the padded roll by securing the padded layer 50 in the folded or lowered position 50.

The padded roll 50 can be easily and quickly moved to the protective bonnet position without disturbing the infant. The protection afforded by the protective bonnet can minimize the need to swaddle the head of the infant with blankets or add clothing but especially to shield the infant from the sun or wind or other environmental concerns.

It is therefore to be understood that while preferred forms of invention are herein set forth and disclosed that the above and other modifications and changes may be made therein without departing from the spirit and scope of the present invention as defined by the appended claims. For example, the padded roll 50 can be formed in an "accordion" manner rather than doubling over. Other methods of forming this padded roll can be utilized which will allow the layer to be moved from a lowered padded position providing protection from impact to a generally convex shell in the extended position providing protection from the environment.

What is claimed is:

1. An infant rest comprising:
    a base panel for supporting at least the head of an infant;
    a protective member extending upwardly from one end of said base panel and having a folded position for providing protection to the head of an infant; and
    means for releasing said protective member from said folded position wherein said protective member forms a self-supporting doubled thickness of padding to an unfolded position wherein said protective member forms a single thickness and extends outwardly from the base panel said protective member being in said folded position for protecting an infant from the effects of the surrounding environment.

2. The infant rest of claim 1 wherein said protective member is of a generally U-shaped configuration and includes:
    an upper edge and a lower edge wherein said lower edge is secured to said base panel; and
    said releasing means having a first portion attached to said upper edge of said protective member and a second portion attached to said lower edge of said protective member so that when said first portion of said releasing means engages said second portion of said releasing means, said protective member forms said folded position of said doubled thickness of padding and when said first portion and second portion of said releasing means are disengaged, said protective member is moved into said unfolded position.

3. The infant rest of claim 1 wherein said releasing means of said protective member comprises:
    a releasable fastener having a first portion and a second portion, said first portion extending along said upper edge of said protective member and said second portion extending along said lower edge of said protective member, said releasable fastener for releasably retaining said protective member in said folded position and for releasing said protective member to said unfolded position.

4. The infant rest of claim 1 wherein said protective member includes:
    a flexible compressible resilient material.

5. The infant rest of claim 1 wherein said protective member includes:
    a first layer of soft material; and
    a second layer of firm resilient compressible flexible material.

6. The infant rest of claim 1 wherein said base panel includes:
    a first layer of soft material; and
    a second layer of firm resilient material.

7. An infant rest comprising:
    a base panel for supporting at least the head of an infant;
    a semi-circular flexible padded layer having an upper edge and a lower edge wherein said lower edge is adjacent to said base panel;

releasable fastener means for connecting said upper edge of said flexible padded layer to said lower edge of said flexible padded layer wherein said flexible protective member forms a folded protective cushion around the head of an infant supported on said base panel and said fastener means including means for releasing said padded layer into an unfolded position thereby forming a self-supporting protective shield from the effects of the environment when said upper edge of said flexible padded layer unfolds and advances upwardly away from said base panel.

8. The infant rest of claim 7 wherein said flexible padded layer includes:
a layer of a compressible material.

9. The infant rest of claim 7 wherein said flexible padded layer includes:
a first layer of soft material; and
a second layer of compressible material.

10. The infant rest of claim 7 wherein:
said flexible padded layer terminates in opposite free ends and has a height which is greatest at a midpoint between said opposite free ends and smallest at each said opposite free end such that when said flexible padded layer is unfolded said upper edge slopes downwardly from said midpoint into said free ends.

11. The infant rest of claim 10 wherein:
said releasable fastener is a zipper.

12. The infant rest of claim 10 wherein:
said releasable fastener includes snap fasteners.

13. An infant support comprising:
a base panel for supporting at least the head of an infant;
a curved flexible padded layer at one end of said base panel having a generally U-shaped configuration with upper and lower edges and terminating in opposite free ends wherein said padded layer has a height which is greatest at a midpoint between said opposite free ends and smallest at each said opposite free end;
means for affixing said lower edge of said free ends of said flexible padded layer to said base panel for supporting the shoulders of an infant; and
a releasable fastener connecting said upper edge of said flexible padded layer to said lower edge of said flexible padded layer wherein said flexible padded layer is doubled upon itself to form a padded protective cushion around the head of an infant supported on said base panel, and including means for releasing said upper edge of said padded layer to extend upwardly into a single upright, self-supporting layer to form a generally convex shell wherein said midpoint of said upper edge slopes downwardly from said midpoint into said free ends thereby shielding the head of said infant from environmental conditions.

14. The infant support of claim 13 wherein said flexible padded layer includes:
at least one layer of compressible material.

15. The infant support of claim 13 wherein said releasable fastener comprises:
one or more snaps.

16. The infant support of claim 15 wherein said releasable fastener comprises:
a zipper.

17. The infant support of claim 15 wherein said affixing means include:
snap connectors between said lower edge of said free ends and said base panel.

* * * * *